US012228207B1

(12) United States Patent
Millard et al.

(10) Patent No.: US 12,228,207 B1
(45) Date of Patent: Feb. 18, 2025

(54) TRANSMISSION BRAKE SYSTEM AND TRANS BRAKE MECHANISM

(71) Applicants: Dmitri Millard, Miamisburg, OH (US); Kodi Alan Koch, Matinsville, IN (US)

(72) Inventors: Dmitri Millard, Miamisburg, OH (US); Kodi Alan Koch, Matinsville, IN (US)

( * ) Notice: Subject to any disclaimer, the term of this patent is extended or adjusted under 35 U.S.C. 154(b) by 0 days.

(21) Appl. No.: 18/663,809

(22) Filed: May 14, 2024

(51) Int. Cl.
F16H 61/06 (2006.01)
F16H 61/00 (2006.01)

(52) U.S. Cl.
CPC ... *F16H 61/061* (2013.01); *F16H 2061/0062* (2013.01)

(58) Field of Classification Search
CPC .............. F16H 61/061; F16H 2061/0062
USPC ............................................ 74/335
See application file for complete search history.

(56) References Cited

U.S. PATENT DOCUMENTS

| 6,155,126 A * | 12/2000 | Vogt | F16H 61/32 74/335 |
| 7,069,800 B2 * | 7/2006 | Knecht | F16H 63/3023 74/335 |
| 7,278,950 B2 * | 10/2007 | Steen | F16H 61/702 475/303 |
| 8,214,094 B2 * | 7/2012 | Sasaki | B60K 6/365 180/65.265 |
| 8,720,291 B2 * | 5/2014 | Moufawad | F16H 3/74 74/331 |
| 11,619,300 B2 * | 4/2023 | Tsukizaki | F16H 3/091 74/335 |

* cited by examiner

Primary Examiner — Ha Dinh Ho
(74) Attorney, Agent, or Firm — R. William Graham

(57) ABSTRACT

A system for modifying an automatic transmission of a vehicle which has a plurality of clutch packages to provide a low gear and a plurality of high gears and a transmission control module equipped to run the transmission in a normal start gear mode with shifting beginning from low gear and progressing to the higher gears and a higher start gear mode beginning at one of the higher gears, wherein the system includes a clutch brake mechanism connected to the transmission which when actuated on during initiation of the higher start gear mode, applies increased pressure on a predetermined clutch package creating a temporary clutch brake to keep in check clutch packages engaged for the higher start gear mode, and upon actuating off releases the predetermined clutch package thereby enabling enhanced take off speed with the high gear clutch packages being engaged.

16 Claims, 11 Drawing Sheets

TRANSMISSION BRAKE SYSTEM AND TRANS BRAKE MECHANISM

FIELD OF THE INVENTION

The present disclosure relates to a system for manipulating an automatic transmission, and in particular to a system for manipulating a normal gear progression of a transmission by selectively controlling a clutch package to perform as a brake to offset one or more clutch package attempting to drive a vehicle in a forward position.

BACKGROUND OF INVENTION

A conventional internal combustion engine is coupled to a transmission which in the case of a truck, can include an Allison® 1000 or other model, for example. A typical Allison® automatic is fully electronically controlled which employs an electronic controls package which oversees the operation of the transmission, controlling transmission upshifts and downshifts, and providing important information on the operation of the drive system. Readouts enable monitoring transmission oil levels and reading diagnostic codes.

With original equipment manufacturers (OEMs), street versions of the Allison (and other type) transmissions are specified to naturally move from first gear upward to a max drive and then backed down in a reversed stepwise manner. The progression is performed through an automated controller. These transmissions are also equipped with a tow mode and the ability to start the vehicle in a higher gear by engaging a second gear or third gear clutch pack.

Recently, there has been a desire to enhance these transmissions to enable them to convert from their traditional street legal versions to a racing application. In this regard, racers or people desiring more initial speed of the vehicle look for enhancements to improve desired performance. As in the case of a truck having an Allison 1000 transmission, a transmission control module (TCM) Tuning is provided with a modification of the programming calibration of a vehicle's TCM, which handles the strategy, timing, and schedule for switching between gears. Tuning, in this use, is an aftermarket adjustment to the calibrations that are programmed by the factory. Coming from the factory, a truck's transmission calibration leaves a lot to be desired. In modern trucks, the shifting is decided by the computer, from determining line pressure through the gears to deciding when the torque converter locks up.

The factory calibration isn't configured for optimal performance or driving experience, leaving potential significant room for enhancements. It is also desirable to provide a device that can be attached to a component of the vehicle transmission to aid in this regard. The instant invention provides a solution to meet a desired manipulation to existing transmissions.

SUMMARY OF THE INVENTION

It is an object to manipulate transmission performance to hold the vehicle in place while in drive (2nd or higher gear) by applying a selected clutch.

Another object is to retrofit a transmission with a system and trans brake mechanism to provide for selective clutch package manipulation.

Still another object is to provide a trans brake through manipulation of a clutch package in a transmission.

Accordingly, the invention is system for modifying an automatic transmission which has a plurality of clutch packages used simultaneously to provide reverse and forward gears. These gears are determined by the Transmission Control Module (TCM) based off the gear selector and sensor inputs.

The TCM is equipped to run the transmission in a normal drive gear mode with shifting beginning from low gear and progressing to the higher gears. The TCM also has the ability to be tuned or modified for race applications and a higher gear start is possible through Tow/Haul mode. This allows for the ability to apply a select clutch package to lock up the transmission/hold the vehicle in place while in drive when activated. While activated rpm can be increased or decreased based off desired acceleration rate. When deactivated, a low gear and a plurality of high gears and a transmission control module is equipped to run the transmission in a normal start gear mode with shifting beginning from low gear and progressing to the higher gears and a higher start gear mode beginning at one of the higher gears.

The system includes a clutch brake mechanism which when actuated on during initiation of the higher start gear mode, applies increased pressure on a predetermined clutch package creating a temporary clutch brake to keep in check clutch packages engaged for the higher start gear mode, and upon actuating off releases the predetermined clutch package thereby enabling enhanced take off speed with the high gear clutch packages being fully engaged.

For example, the system can include one or more solenoid to control factory C5 port transmission fluid to or from C5 piston. These solenoids can control mainline pressure port fluid flow and modified mainline pressure flow to C5 piston and also release flow from C5 piston. A single three port solenoid valve can also be used to allow fluid flow from the factory C5 supply to the C5 piston freely through two of the ports when solenoid is not energized while blocking flow from mainline or modified mainline on the other port. This allows for the transmission to shift or drive like normally designed from the factory. This may also be done with two solenoids a normally open solenoid and a normally closed solenoid. A third solenoid may be added for additional return flow to the pan for a quicker release time of the C5 clutch.

This all being done with the factory C5 port being tapped and plugged in rear extension housing, also referred to as tail housing. Redirecting factory C5 port flow to solenoids through a drilled and tapped hole of the C5 port inside of the transmission case. In factory application, this port is used to supply and exhaust fluid flow from the C5 piston. Solenoids can use factory C5 port to flow fluid to C5 piston or exhaust fluid if need be.

Generally speaking, the system can include one or more solenoid to receive transmission fluid through a first feed line from a transmission fluid supply reservoir, and deliver transmission fluid through a second feed line from the one or more solenoid valve to a back of a piston in the predetermined clutch package applying pressure on the piston as well as enabling return of transmission fluid through in a reverse manner through the one or more solenoid to the reservoir thus enabling two way fluid flow. Additionally, the one or more solenoid can include a third input feed line directly connecting to a main transmission fluid line permitting one-way fluid flow to deliver fluid to the one or more solenoid in order apply increased pressure to the piston. Further, the one or more solenoid can preferably be configured to step up pressure delivered from the one or more solenoid. In using the system as a retrofit application, the normal transmission fluid channel which normally feeds fluid line pressure to the piston is blocked off, as the first feed line of the system replaces the fluid channel function.

In a more detailed example, a controller is connected to the one or more solenoid(s) to control the solenoid(s) on and off. When in the "off" position with a three port solenoid, fluid will flow from port 1 or factory C5 port to port 2 the C5 piston and port 3 on the solenoid or main line will be blocked. When the system is activated "on", port 3 or mainline will flow to port 2 or C5 piston and port 1 or factory C5 supply will be blocked with port 3 feeding stepped up pressure to port 2 and C5 piston. After solenoid valve has been activated and deactivated, fluid will flow from C5 piston or port 2 on solenoid back to port 1 in a conventional manner with the factory C5 port exhausting back through the valve body to an oil pan and port 3 will be blocked. Subsequently, transmission fluid is returned.

With a two way solenoid setup, a first solenoid will be a normally open position exists in one solenoid between factory C5 port and C5 piston that will freely flow fluid as the valve body supplies it. A second solenoid will be normally closed with mainline suppling it on one side and the other side will be connected to the C5 piston supply. When activated both solenoids will be energized, the first normally open solenoid will close and stop flow from the C5 piston. The normally closed solenoid will open and supply mainline to C5 piston. After the two solenoid valves have been activated and deactivated, mainline from the normally closed solenoid will be blocked and fluid will flow from the C5, then will flow back through the normally open solenoid to the factory C5 port in transmission valve body passage.

Factory C5 control flow is being used for normal driving operations in both setups. An additional normally closed solenoid may be added to either setup for quicker clutch disengagement or be used as a bump but is not required. One side of solenoid will be connected to C5 piston housing and the other side will return back to the pan. This will only be activated momentarily for bump or for a set amount of time after transbrake bottom is released. Additional electrical controls will be required for this option.

The system includes a controller connected to the one or more solenoid to actuate the solenoid on and off. When in the off position, the communication between the third input feed line and the one or more solenoid is shut off and fluid flows back and forth through the one or more solenoid in order to perform under normal start gear mode with the existing transmission control module. When in the "on" position, the communication between the third input feed line and the one or more solenoid is permitted and fluid flows to the one or more solenoid and pressure is increased and applied to the predetermined clutch package to cause engagement of thereof The controller can be actuated manually through a switch mounted inside the vehicle, such as a momentary switch on a steering wheel. Additionally, a bump switch can also be added to pause the action of the controller and temporarily permit the disengagement of the predetermined clutch package. By tapping on the bump switch, it can bump the vehicle forward.

It is important to note that controller should only be active when stopped and the TCM is in the higher start gear mode and at the initiation of this mode. In other words, severe damage could occur if the system where activated while the vehicle was moving. Accordingly, a sensor can be provided, such as a speed sensor, wherein the controller is prevented from actuating on preventing the fluid flow communication between the one or more solenoid to the main line transmission fluid feed. The system can optionally include an intensifier device, which can be an additional solenoid in the third feed line to further enhance fluid pressure.

With the enhanced amount of fluid and pressure, it is contemplated that there may be required modifications to enhance the return springs in the predetermined clutch package to aid in return of the piston. Accumulator piston springs can be added to aid in piston return. Also, given the additional fluid which will be present, there may be need to increase or add additional bleed holes through which the transmission fluid can pass and will naturally find its way to the to the transmission oil pan via an open area within a housing of the transmission.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
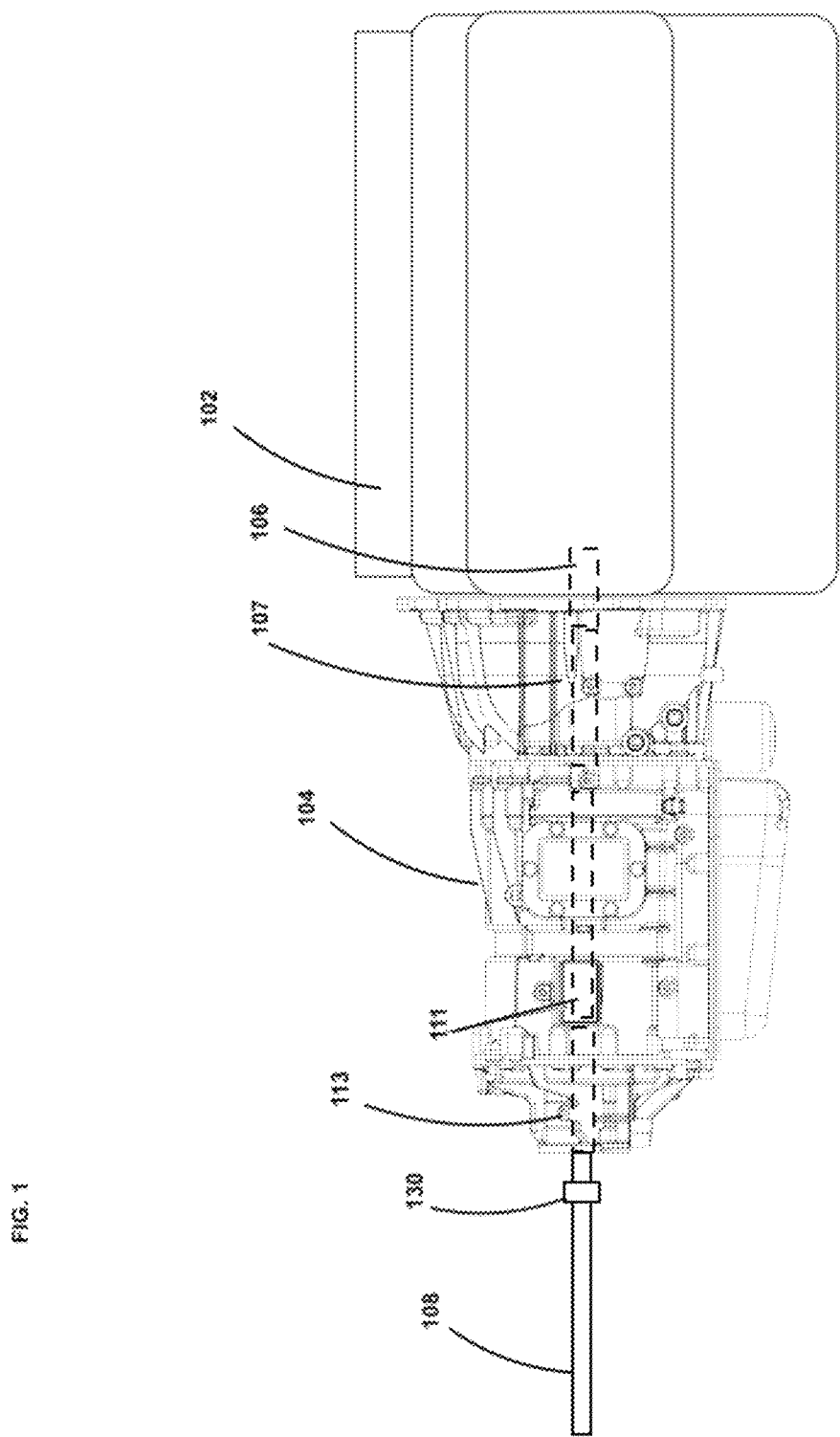
FIG. 1 is an illustration of a typical power and transmission unit of a vehicle.

Referring now to the drawings, FIG. 1 depicts a schematic of a drive unit 102 and transmission 104 is shown. In the illustrated embodiment, the drive unit 102 may include an internal combustion engine, diesel engine, electric motor, or other power-generating device. The drive unit 102 is configured to rotatably drive a shaft 106 that is operably coupled to a shaft 108 via interconnected shafts 107, 111, 113 in transmission 104 as described below.

Figure 2:
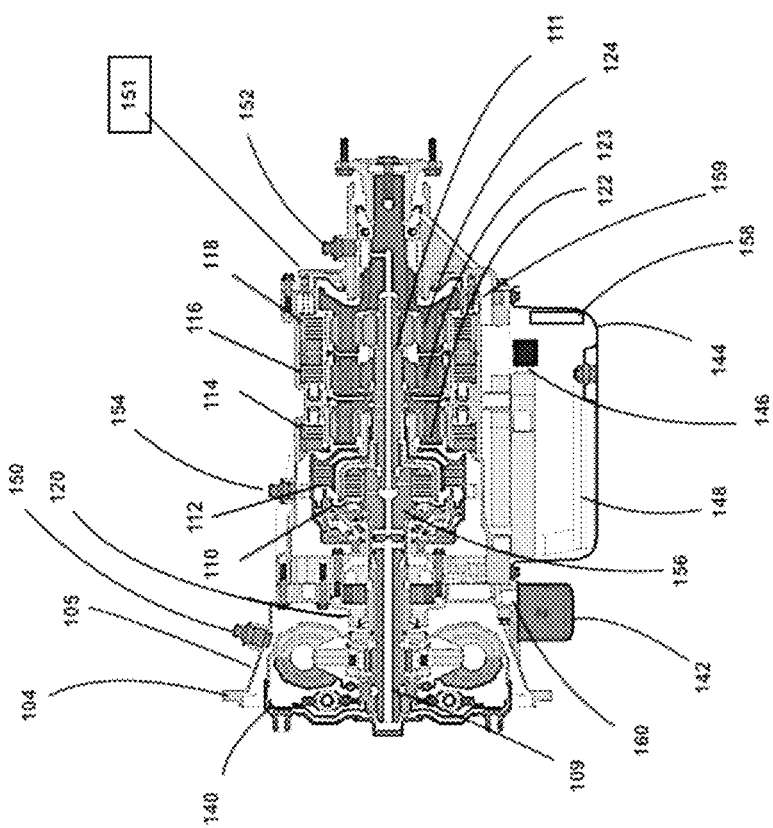
FIG. 2 is a schematic view of one illustrative embodiment of a system of the invention.

As seen in FIG. 2, the transmission 104 can, for example, be that of an Allison Transmission® type, can also include a housing 105, first clutch package 110, second clutch package 112, third clutch package 114, fourth clutch package 116 and fifth clutch package 118. A pump 120 can be driven by a shaft 109 that is coupled to the input shaft 106 of the drive unit 102 in FIG. 1. In this arrangement, the drive unit 102 in FIG. 1 can deliver torque to the input shaft 109 for driving the pump 120 and building pressure within the different circuits of the transmission 104 including C5 clutch package.

The transmission 104 can include a planetary gears 122, 123 and 124 in housing 105 can be automatically selected by a transmission control module (TCM) 151 inside a vehicle. An intermediate shaft 111, connects to shaft 113 of the transmission 104 and is coupled to or integral with, and rotatably drives, shaft 108 and is coupled via a conventional universal joint 130. The universal joint 130 is coupled to, and rotatably drives, an axle having wheels mounted thereto at each end. The shaft 113 of the transmission 104 connects to shaft 108 to drives the wheels of the vehicle in a conventional manner as is known in the art.

Other parts include a torque converter assembly 140, control main filter 142, oil pan 144, control valve modules 146, suction filter 148, input speed sensor 150, output speed sensor 152, turbine speed sensor 154 and rotating clutch module 156, solenoid package 158, and a fluid channel 159 which conventionally feed pressure to a piston 186 in clutch package 118. Now, as seen in FIG. 3, the system 10 of the instant invention for manipulating a normal gear progression of the transmission 104 by selectively controlling a clutch package, here 118, to perform as a brake to offset one or more clutch package, e.g., higher gear clutch packages, C1-C4, attempting to drive a vehicle in a forward position.

The automatic transmission 104 employs has a plurality of clutch packages 110, 112, 114, 116, and 118 to provide a low gear and a plurality of high gears and a transmission control module equipped to run the transmission in a normal start gear mode with shifting beginning from low gear and progressing to the higher gears and a higher start gear mode beginning at one of the higher gears. The system 10 provides a clutch brake mechanism which when actuated "on" during initiation of the higher start gear mode, applies increased pressure on a predetermined clutch package 118, commonly referred to as C5, creating a temporary clutch brake to keep in check one or more clutch packages, that engage second and higher drive gears. Upon actuating the system "off" releases the predetermined clutch package 118 thereby enabling enhanced take off speed with the high gear clutch packages 112 and 114 being fully engaged.

Figure 3:
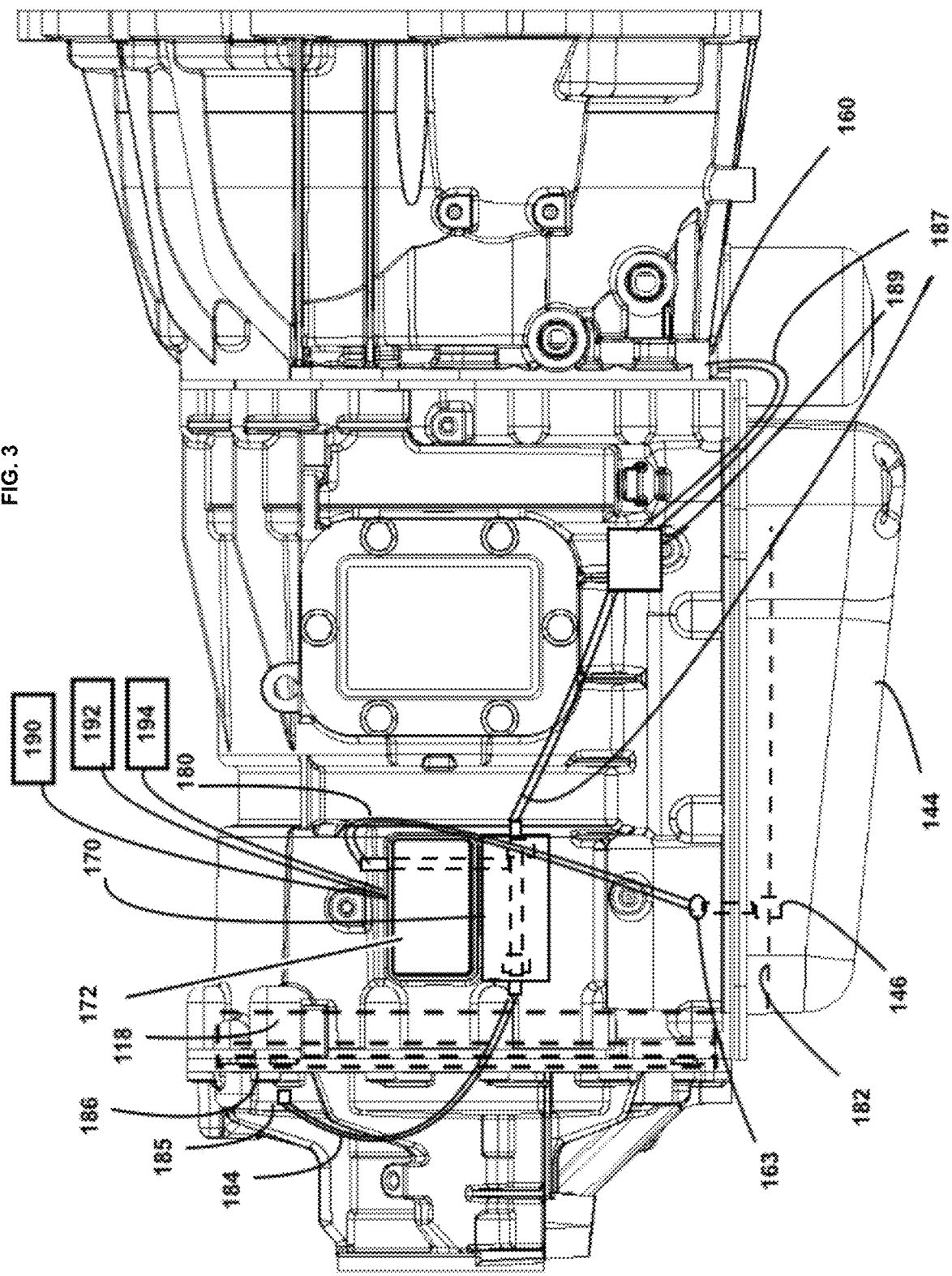
FIG. 3 is another schematic of the instant invention.
Figure 4:
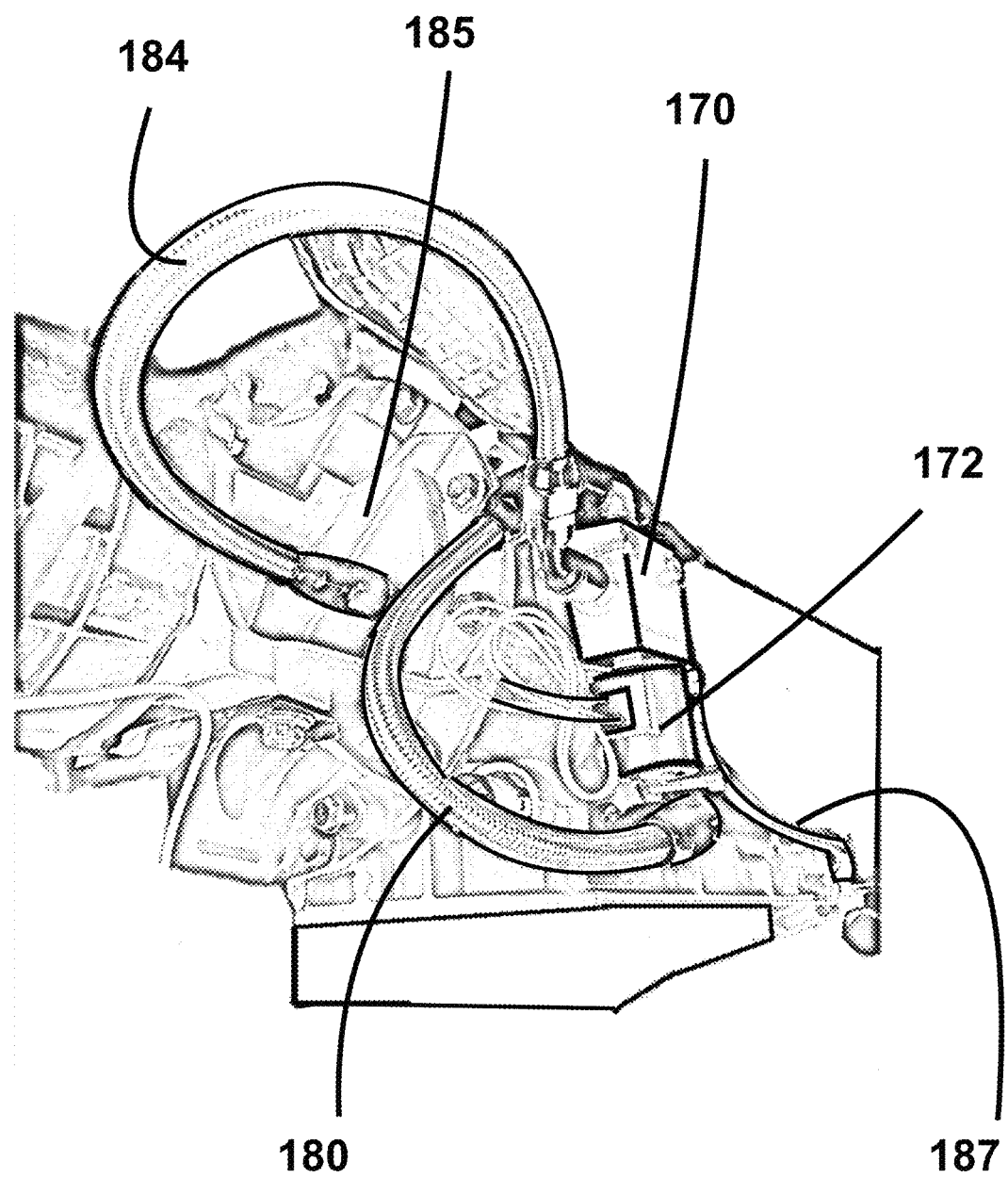
FIG. 4 depicts a perspective view of the system of the invention mounted on a transmission.
Figure 5:
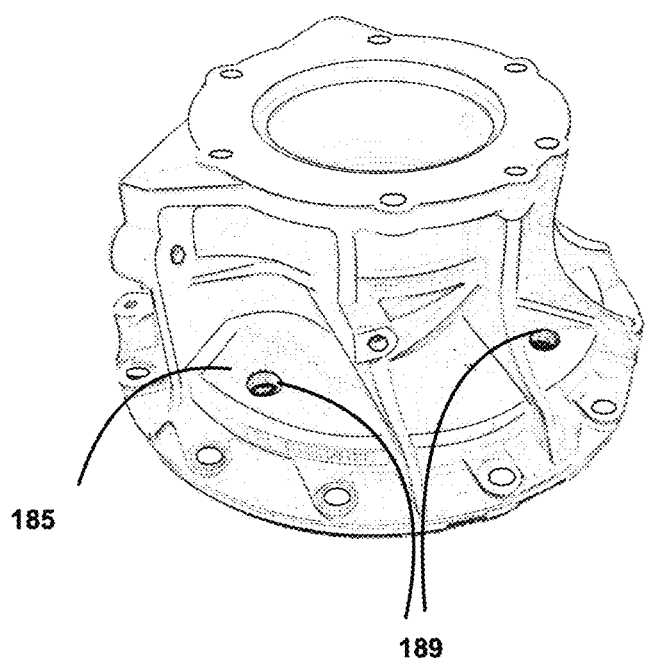
FIG. 5 is a perspective view of a tail housing.

As depicted in FIG. 3, the system 10 can include one or more solenoid 170, which in this case a preferred solenoid 170 is a 3-way valve solenoid with a controller box 172 which receives transmission fluid a first feed line 180 factory C5 supply from a transmission fluid supply reservoir 182 and as will be understood in viewing FIGS. 5-12, and delivers transmission fluid through a second feed line 184 from the one or more solenoid valve 170 to a back of a piston 186 (in dashed lines in FIG. 3) in the clutch package 118 through one or more orifice 189 in a tail housing 185 in FIG. 5. By applying pressure on the piston 186 which engages the clutch package 118 serving as a brake, this occurs when the system 10 is "on" receiving fluid through third feed line 187 in a one way flow path or when the system 10 is "off" and the TCM 151 sends a signal to apply pressure. When the system 10 is "off", the solenoid 170 blocks communication with the third feed line 187 and enables flow in a conventional manner to the piston 186 and return of transmission fluid through in a reverse manner through the solenoid 170 to the supply reservoir 182 through factory c5 port via orifices 163 to 161 thus enabling two way fluid flow through the solenoid 170. Further, there can be one or more solenoid 170 similarly configured and it is further contemplated that each can be configured to step up pressure delivered from the one or more solenoid 170. In using the system 10 as a retrofit application, normal transmission fluid channel 159 which feeds fluid line pressure to the piston 186 is blocked off, as the first feed line 180 of the system 10 replaces the fluid channel function.

Figure 6:
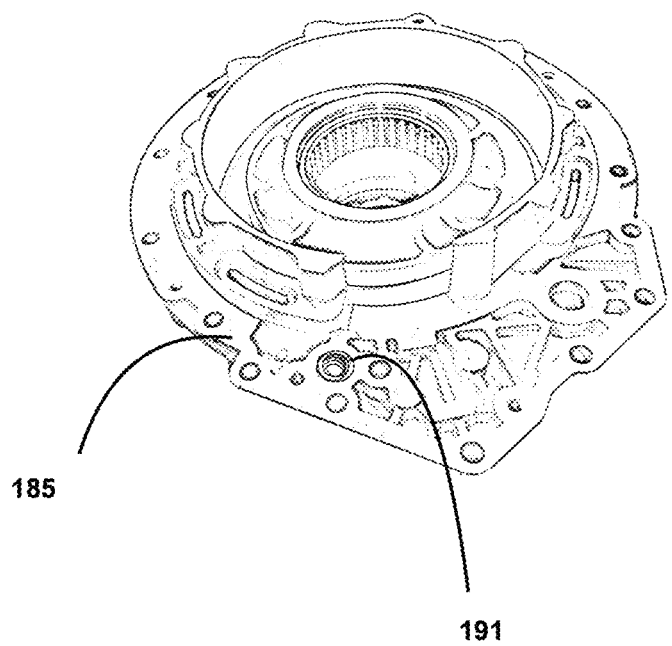
FIG. 6 is a perspective view of a tail housing.
Figure 7:
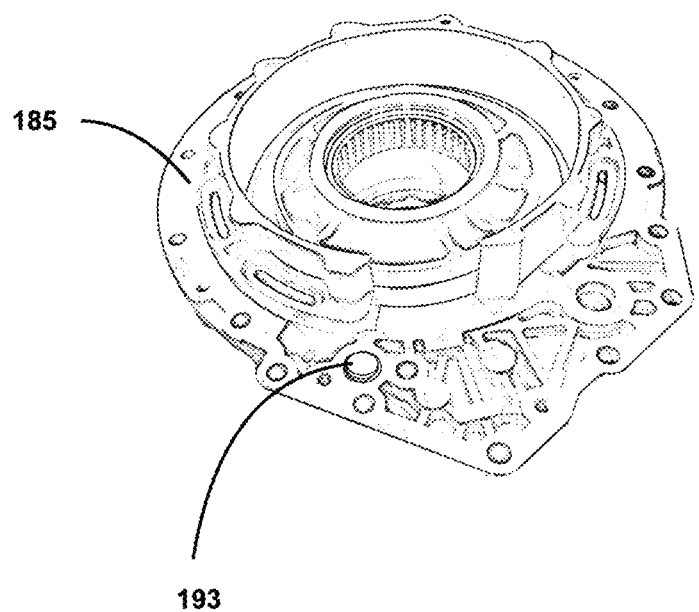
FIG. 7 is another perspective view of a modified tail housing with a plug.
Figure 8:
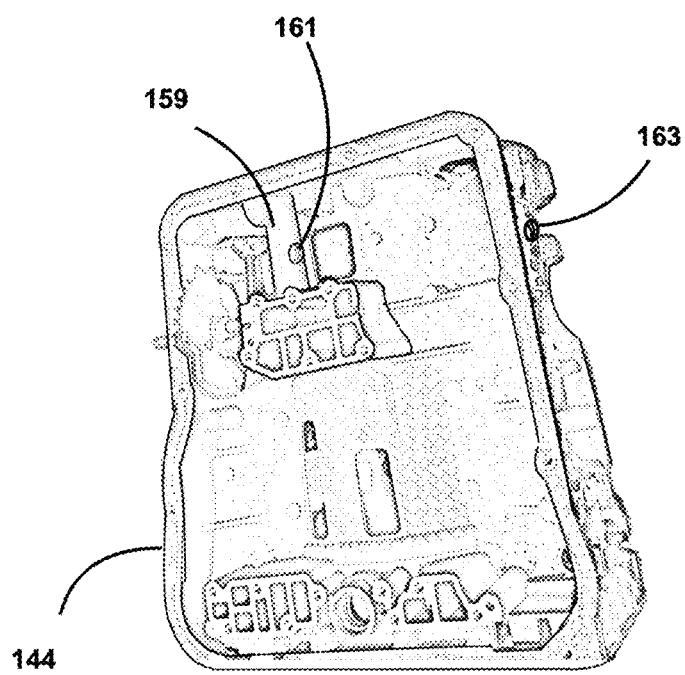
FIG. 8 is a perspective of a modified oil pan of the invention.
Figure 9:
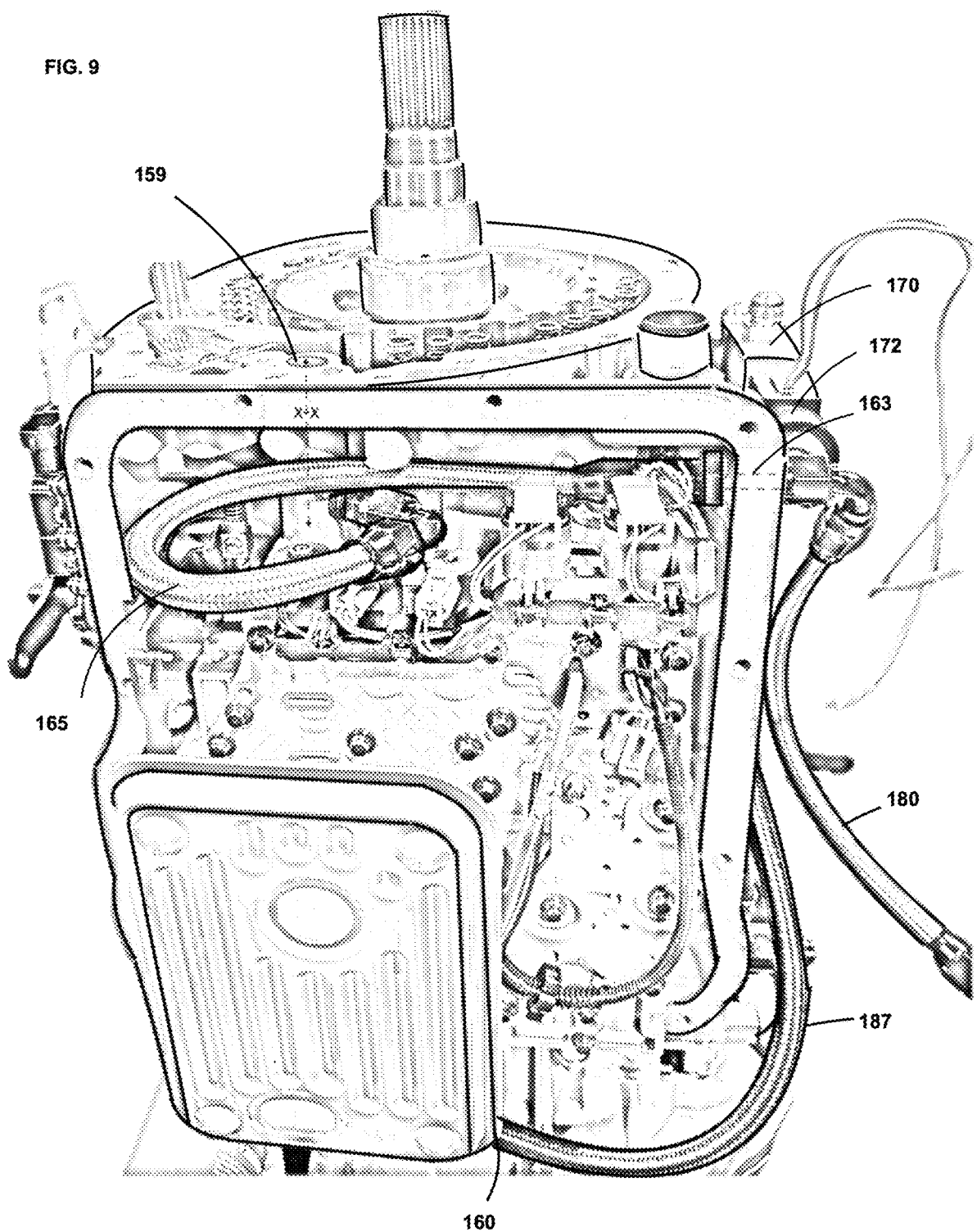
FIG. 9 is a perspective view of showing the modified oil pan of FIG. 8 mounted to a transmission with hose connections of the instant invention.

Note, FIGS. 5-7 depict the tail housing 185 which shows threaded orifices 189 made in the back side thereof. One or more solenoid 170 can be used to connect to the orifices 189. If only one is in use, then the other orifice 189 can be plugged off. As seen in FIGS. 6 and 7, inside of the tail housing 185 there exists a port 191 which normally mates to a fluid channel 159 which is in the transmission housing 105 above oil pan 144 as seen in FIGS. 8 and 9. As seen in FIG. 6, the port 191 has been modified in the instant invention to be threaded tapped and to receive a threaded plug 193 as seen in FIG. 7. This blocks the normal fluid communication in the transmission rerouting through the new system 10. Note, the path identified by line x-x through fluid channel 159 in the transmission 104 above oil pan 144 is blocked with plug 193 and the channel 159, which is a passage in a body portion of the transmission 104, is modified as seen in FIG. 8 to be bored and threaded to create threaded orifice 161 and the housing 105 above the oil pan 144 further includes another tapped threaded orifice 163. It is apparent from FIG. 9, a hose 165, e.g., -8 AN, interconnects the orifices 161 and 163 to feed the newly created path for normal operation of the transmission 104.

The system 10 includes a controller box 172 connected to the solenoid 170 to actuate the same on and off. Again, when in the "off" position, the communication between the third input feed line 187 and the solenoid 170 is shut off and fluid only flows back and forth through the solenoid 170 in order to perform under normal start gear mode with the existing transmission control module 151. When in the "on" position, the communication between the third input feed line 187 and the solenoid 170 is permitted and fluid flows to the solenoid 170 and pressure is increased and applied to the piston 186 to cause engagement of clutch package 118.

The controller 172 can be actuated manually though a switch mounted 190 which can be inside a vehicle including, for example, a momentary switch 190 on a steering wheel. Additionally, a bump switch 192, which can be a smart relay, can also be added to pause the action of the controller 172 and temporarily permit the disengagement of the clutch package 118. By tapping on the bump switch 192 while holding on the momentary switch 190, it can bump the vehicle forward.

It is important to note that controller 172 should only be active or preferably activatable when the TCM 151 is in the higher start gear mode and at the initiation of this mode or when the vehicle is stopped. In other words, severe damage could occur if the transmission 104 when activated while the vehicle is moving. Accordingly, a sensor 194 can be provided, such as a speed sensor, wherein the controller 172 is prevented from being actuated "on" preventing the fluid flow communication between the solenoid 170 to the main line transmission fluid feed 160 in which the line 187 connects to an existing port on a bottom of the transmission 104. The system 10 can optionally include an intensifier device 189, which can be an additional solenoid disposed in the third feed line 187 to further enhance fluid pressure.

Figure 10:
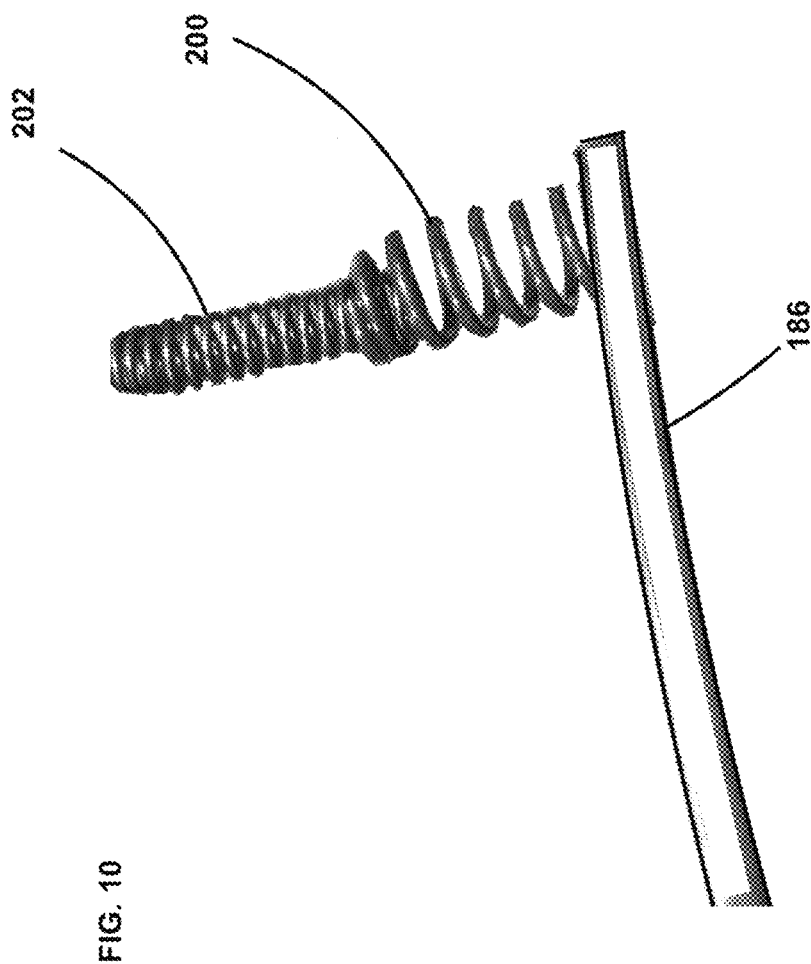
FIG. 10 depicts a perspective of part of a piston with a spring modification of the invention.
Figure 11:
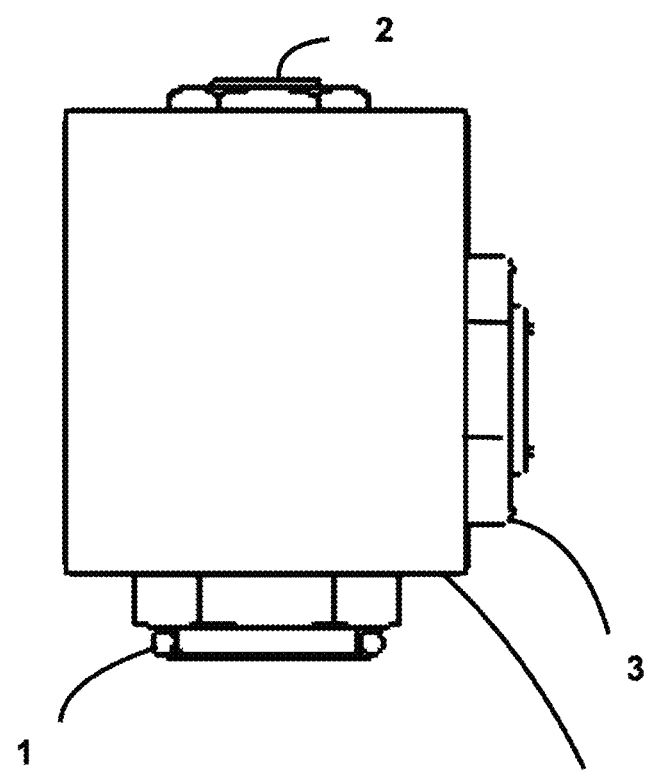
FIG. 11 depicts a three-way valve of the invention.
Figure 12:
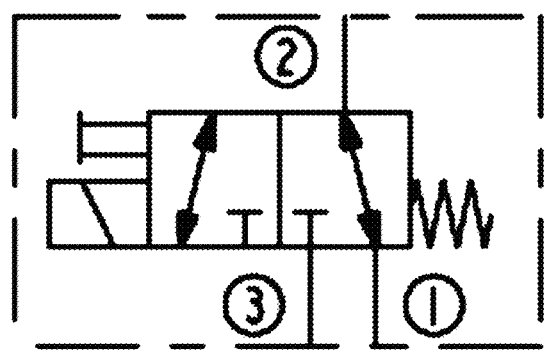
FIG. 12 depicts a schematic operation of the three-way valve of the invention.

With the increased amount of pressure and flow from mainline and modified mainline, line size of -8 AN or ½ inch from C5 piston housing to factory C5 port and a -6 AN or ⅜ inch main line 187 feed to solenoid 170, it is contemplated that there may be required modifications to enhance the return springs 200 in connection with the piston 186 and clutch package 118 to aid in return of the piston 186 to normal position. In this regard, accumulator piston springs 202 having an OD of 0.31 as seen in FIG. 10 fit inside stock spring 200 having ID 0.34 and can be provided to aid piston 186 in its return after its forced engagement during use. Also, given the additional fluid which will be present during the "on" mode, there may be need to increase size or add additional bleed holes in the piston 186 through which the transmission fluid can pass and upon so doing will naturally find its way to the to the transmission oil pan 144 via an open area within a housing 105 of the transmission 104.

The transmission 104 further includes an electro-hydraulic system as is known in the art that is fluidly coupled to the planetary gear system. The electro-hydraulic system is responsive to control signals to selectively cause fluid to flow through one or more of the fluid paths to control operation, i.e., engagement and disengagement, of a plurality of corresponding friction devices in the planetary gear system. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system. In any case, changing or shifting between the various gears of the transmission is accomplished in a conventional manner by selectively controlling the plurality of friction devices via control of fluid pressure within the number of fluid paths.

The exemplary system 10 includes controller 172 connected to the one or more solenoid(s) 170 (In FIG. 12) to control the solenoid(s) on and off. When in the "off" position with three-way port solenoid 170, fluid will flow from port 1 or factory C5 port to port 2 the C5 piston and port 3 on the solenoid 170 or main line will be blocked. When the system 10 is activated "on", port 1 or mainline will flow to port 2 or C5 piston and port 1 or factory C5 supply will be blocked with port 3 feeding stepped up pressure to port 2 and C5 piston. After solenoid valve 170 has been activated and deactivated, fluid will flow from C5 piston or port 2 on solenoid back to port 1 in a conventional manner with the factory C5 port exhausting back through lines 184, 180, orifice 163, line 165 and orifice 161 to channel 156 of valve body to an oil pan and port 3 will be blocked.

Using an alternative a two way solenoid 170 setup, a first solenoid 170 will be a normally open position exists in one solenoid 170 between factory C5 port and C5 piston that will freely flow fluid as the valve body supplies it. A second solenoid 170 will be normally closed with mainline suppling it on one side and the other side will be connected to the C5 piston supply. When activated both solenoids 170 will be energized, the first normally open solenoid 170 will close and stop flow from the C5 piston. The normally closed solenoid will open and supply mainline to C5 piston. After the two solenoid valves 170 have been activated and deactivated, mainline from the normally closed solenoid will be blocked and fluid will flow from the C5 will flow back through the normally open solenoid back to the factory C5 port in transmission.

The transmission control circuit 151 that can include a memory unit, microprocessor, and operating instructions stored therein that are executable by a processor of the transmission control circuit 151 to control operation of operation of the transmission 104, i.e., shifting between the various gears of the planetary gear system. It will be understood, however, that this disclosure contemplates other embodiments in which the transmission control circuit 151 is not microprocessor-based, but is configured to control operation of components based on one or more sets of hardwired instructions and/or software instructions stored in the memory unit.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A system for modifying an automatic transmission of a vehicle which has a plurality of clutch packages to provide a low gear and a plurality of higher gears and a transmission control module equipped to run the transmission in a normal start gear mode with shifting beginning from low gear and progressing to the higher gears and a higher start gear mode beginning at one of the higher gears, wherein said system includes:

a clutch brake mechanism connected to the transmission which when actuated on during initiation of the higher start gear mode, applies increased pressure on a predetermined clutch package creating a temporary clutch brake to keep in check another clutch package engaged for the higher start gear mode, and upon actuating off releases said predetermined clutch package thereby enabling enhanced take off speed with said another clutch package being engaged.

2. The system of claim 1, which includes one or more solenoid is equipped to receive transmission fluid through a first feed line from a transmission fluid supply reservoir, and deliver transmission fluid through a second feed line from said one or more solenoid valve to a back of a piston in said predetermined clutch package applying pressure on said piston as well as enabling return of transmission fluid, and said one or more solenoid includes a third input feed line directly connecting to a main transmission fluid line and is equipped to permit one-way fluid flow to deliver fluid to said one or more solenoid in order apply increased pressure to said piston.

3. The system of claim 2, wherein said return is characterized to be in a reverse manner through said one or more solenoid to said transmission fluid supply reservoir thus enabling two way fluid flow.

4. The system of claim 2, wherein said one or more solenoid is configured to step up pressure delivered from said one or more solenoid.

5. The system of claim 3, wherein said system includes a retrofit fluid flow control device, wherein said fluid flow device replaces an existing transmission fluid channel feeding fluid line pressure to said piston and said existing transmission fluid channel is blocked off, said fluid flow device replacing the existing fluid channel function; and a controller connected to said one or more solenoid to actuate said one or more solenoid on and off.

6. The system of claim 3, which further includes a controller characterized such that when in the off position, the controller blocks communication between the third input feed line and said one or more solenoid is shut off and fluid only flows back and forth through said one or more solenoid in order to perform under normal start gear mode with the existing transmission control module and when in the on position, the controller permits communication between said third input feed line and said one or more solenoid is permitted and fluid flows to said one or more solenoid and pressure is increased and applied to said predetermined clutch package to cause engagement of thereof.

7. The system of claim 6, which includes a controller is one of manually and automatically actuated though a switch mounted inside the vehicle.

8. The system of claim 7, wherein said controller includes a momentary switch on a steering wheel.

9. The system of claim 7, which further includes a bump switch to pause the action of said controller and temporarily permit disengagement of said predetermined clutch package.

10. The system of claim 7, which further includes a vehicle motion sensor connected to the controller to prevent from actuating the fluid flow communication between said one or more solenoid to the main line transmission fluid feed.

11. The system of claim 3, which includes an intensifier device to enhance fluid pressure additional solenoid in said third feed line.

12. The system of claim 2, which includes additional return springs in the predetermined clutch package to aid in return of the piston.

13. The system of claim 12, wherein said return springs are of a diameter size to fit within existing return springs within said predetermined clutch package.

14. The system of claim 1, wherein said transmission fluid supply reservoir includes a factory C5 control port.

15. The system of claim 2, wherein said return of said fluid is through a valve body passage.

16. In an automatic transmission of a vehicle which has a plurality of clutch packages to provide a low gear and a plurality of higher gears and a transmission control module equipped to run the transmission in a normal start gear mode with shifting beginning from low gear and progressing to the higher gears and a higher start gear mode beginning at one of the higher gears, which includes:

a clutch brake mechanism connected to the transmission which when actuated on during initiation of the higher start gear mode, applies increased pressure on a predetermined clutch package creating a temporary clutch brake to keep in check another clutch package of the higher gears, and upon actuating off releases said predetermined clutch package thereby enabling enhanced take off speed with said another clutch package being engaged and fluid is obtained by tapping into a transmission fluid passage in a body portion of the transmission.

\* \* \* \* \*